April 18, 1967 R. C. McCOY ETAL 3,314,185
HOOK SETTING MEANS
Filed Oct. 26, 1964
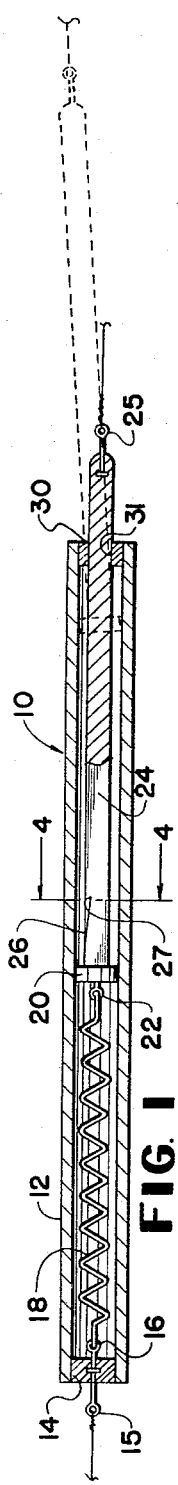
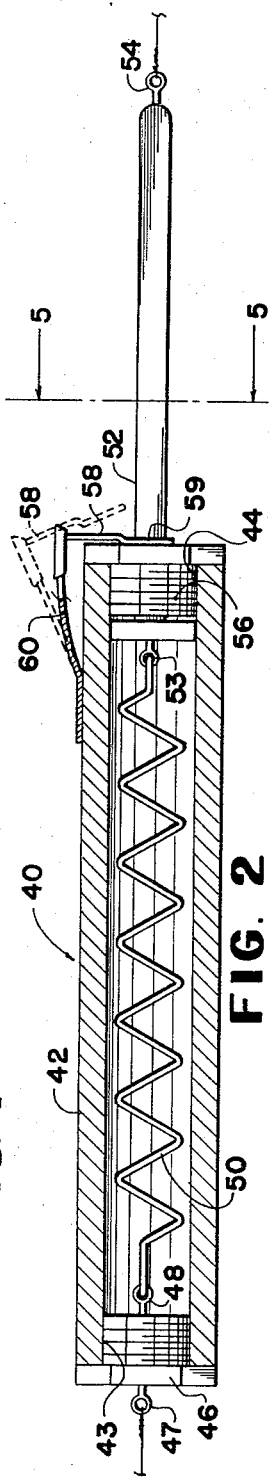
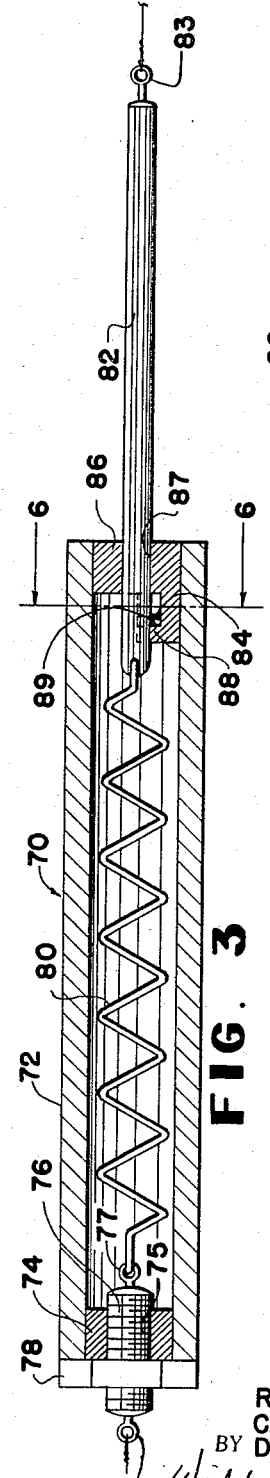
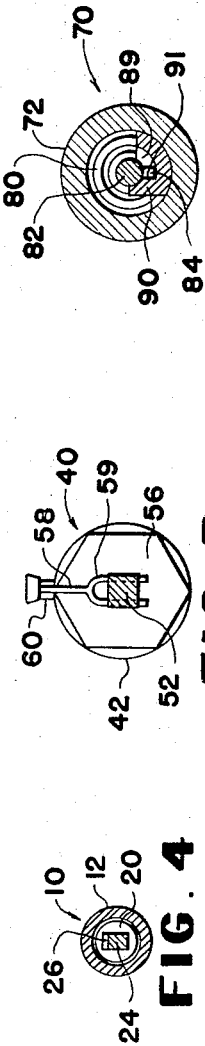
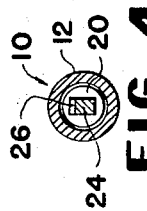
INVENTOR.
RONALD C. McCOY
CARROL FORREST
BY DOUGLAS E. SPATZ
Widdowson and Stoffel
ATTORNEYS

United States Patent Office 3,314,185
Patented Apr. 18, 1967

3,314,185
HOOK SETTING MEANS
Ronald C. McCoy and Carrol Forrest, both of 1622 S. Martinson, and Douglas E. Spatz, 1626 S. Martinson, all of Wichita, Kans. 67213
Filed Oct. 26, 1964, Ser. No. 406,402
5 Claims. (Cl. 43—15)

This invention relates to fishing equipment, more specifically to a new hook setting means. Still more specifically this invention relates to a spring-loaded fish hook setting device adapted to be operatively disposed in the line of a fishing pole or the like.

Fishing is a very popular sport enjoyed by both young and old. Often a novice fisherman is unable to understand why a more experienced fisherman using the same type of bait and fishing in the same general location is able to catch many more fish. There are a number of possible factors which may enter in to explain this phenomena. One of the more important factors may be that the experienced fisherman has mastered the art of setting the fish hook at exactly the right time. This hook setting technique is more involved than might first appear since a proper technique demands rapt attention, trained quick reflexes, and an awareness of the tautness of the fishing line. To the novice fisherman unable to master the proper technique after the fish has taken the bait, fishing as a sport may become dull, discouraging, and less than enjoyable.

We have invented a new hook setting means. The hook setting means of our invention has a plunger means, a means for attaching a line to the plunger means, and a means for slidably mounting said plunger means. A means for fastening a line on the means slidably mounting said plunger means is also provided. A resilient means is associated with the plunger means for urging the retraction of same. A releasable catch means is also provided for maintaining the plunger means in extended position relative to the means mounting same.

The hook setting device of our invention can be utilized by both the novice and experienced fisherman to more efficiently and properly set a fish hook after a fish has taken the bait. The device of our invention is adapted in use to apply a firm sharp jerk on a fish hook operatively secured to same immediately after a fish has tugged at the bait sufficiently hard to set off the catch means. This jerk automatically applied at the proper time to the line secured to the hook is very effective in setting the hook thereby enhancing the likelihood of catching the fish. The operation of the fish hook setting means is automatic and works equally well for the novice or the experienced fisherman. The hook setting device can be easily set or loaded, and will not be inadvertently set-off by a normal usage in casting the line, etc., or by a moderately severe shock.

An object of this invention is to provide a new hook setting means.

Another object of this invention is to provide a new hook setting means that when used in a fish line will apply a sudden sharp jerk to the hook in response to a tug on the line.

Still another object of our invention is to provide a new spring-loaded hook setting device that is largely automatic in operation and can be used by both the novice and experienced fisherman.

Yet another object of our invention is to provide a hook setting device for use with fishing apparatus that can be simply and easily set or loaded.

Another object of this invention is to provide a new hook setting means that is relatively sensitive to tugging by a fish nibbling at a baited hook, and yet relatively insensitive to vibrations, shocks, etc. which might set off same.

Still another object of this invention is to provide a new hook setting means that can be inexpensively manufactured.

Other objects and advantages of the new fish hook setting means of our invention will become apparent to those skilled in the art upon reading the disclosure.

Drawings accompany and are a part of this disclosure. These drawings depict preferred specific embodiments of the new hook setting means of our invention, and it is to be understood that such drawings are not to unduly limit the scope of our invention. In the drawings:

FIG. 1 is a front elevational view in cross section of a preferred specific embodiment of the hook setting means of our invention.

FIG. 2 is a front elevational view in cross section of another preferred specific embodiment of the new hook setting means of our invention.

FIG. 3 is a front elevational view in cross section of still another preferred specific embodiment of the new hook setting means of our invention.

FIG. 4 is a sectional view taken on line 4—4 of FIG. 1.

FIG. 5 is a sectional view taken on line 5—5 of FIG. 2.

FIG. 6 is a sectional view taken on line 6—6 of FIG. 3.

The following is a discussion and description of the new hook setting means of our invention made with reference to the drawings, wherein the same reference numerals are used to indicate the same or similar parts and/or structure. The discussion and description is of preferred specific embodiments of the new hook setting means of our invention, and it is to be understood that such is not to unduly limit the scope of our invention.

Referring now to FIGS. 1 and 4 of the drawings, there is depicted a preferred specific embodiment of a spring-loaded fish hook setting device 10 of our invention. The hook setting device 10 has an elongated cylindrically shaped barrel 12 with a plug 14 secured in one end thereof. Plug 14 can be secured within barrel 12 by any suitable means, as for example by threads, by welding, by soldering, etc. An eyelet 15 is mounted on the outside of plug 14, and a second eyelet 16 is mounted on the inside of the plug 12. A tension-type coil spring 18 is disposed within barrel 12 and is secured at one end to eyelet 16. A second plug or piston 20 is disposed within the barrel 12 and is provided with an eyelet 22 which is in turn secured to the other end of coil spring 18. An elongated rod 24 is positioned within barrel 18 and has one end secured to plug 20. An eyelet 25 is secured to the opposite end. Elongated rod 24 is also provided with a notch 26 positioned adjacent the end secured to plug 20. The notch 26 has a generally transversely extending abutment surface 27. A third plug 30 is secured to the opposite end of barrel 12 and is provided with an aperture 31 slidably receiving the elongated rod 24. The various elements of the hook setting device 10 can be made of any suitable materials, both metals and plastics and the materials are preferably rust resistant.

In use, the hook setting device 10 is secured to a fish line by tying or otherwise securing same to one eyelet 15, and securing the opposite eyelet 25 to the other extending portion of the fish line. Preferably the device 10 is positioned relatively near the fish hook. It can be used with or without a bobber. The hook setting device is loaded by extending the elongated rod 24 thereby stretching the coil spring 18, and hooking the transverse abutting surface 27 of notch 26 on the transverse edge of the third plug 30. This position is shown in dotted lines in FIG. 1. It can be seen that a tug, as provided by a fish nibbling on the bait, will dislodge the elongated rod 24 thereby allowing the coil spring 18 to withdrow same providing a firm sharp tug on the line.

In FIGS. 2 and 5 of the drawings is illustrated another preferred embodiment 40 of the hook setting device of our invention. The hook setting device 40 has a cylindrically shaped elongated barrel 42, which can be made of any suitable type of material such as metal, plastics, etc., and which is preferably provided with interior thread means 43 and 44 on each end of the barrel. A first plug 46 is threadedly secured in one end of the barrel 42 and is provided with an eyelet 47 on the outside of the plug and a second eyelet 48 on the inside. A tension-type coil spring 50 is disposed within barrel 42 and is secured at one end to the eyelet 48 on plug 46. An elongated rod 52 is slidably disposed in cylinder 42 and has an eyelet 53 on one end which is secured to the opposite end of coil spring 50. The opposite end of the elongated rod 52 is provided with a second eyelet 54 which in operation is attached to a fishing line in turn secured to a fish hook. A second plug 56 provided with a central aperture is threadedly secured in the other end of the barrel 42 with the rod 52 slidably disposed in the aperture. Preferably the rod 52 is provided with a non-circular cross section and the aperture in the plug 56 formed to accept the rod. This prevents turning of the rod relative to the plug and barrel.

A lock means is provided to releasably hold the rod 52 in an elongated position to thereby spring load the hook setting device. The lock means consists of an element 58 having a bifurcated end portion 59 positioned in generally transverse relation to rod 52. A leaf spring 60 is secured at one end to the barrel 42 and at the other end to the lock element 58. The spring 60 is arranged to bias the lock element 58 outwardly, as indicated in the dotted lines of FIG. 2. The bifurcated portion 59 of the lock element 58 is adapted to be seated in a groove in elongated rod 52. The hook setting device 40 is loaded when the rod 52 is extended, thereby stretching the coil spring 50. The lock element 58 thereafter is manually forced inwardly until the bifurcated portion 59 is in engagement with a pair of parallel grooves on opposite respective sides of the rod 52. The rod 52 is then slowly eased into engagement with the lock element 58. It can be seen that a slight outwardly directed force on the end of the rod 52 applied by a fish tugging the bait will release the locking element 58 under the action of release spring 60 and allow the plunger to be retracted within the barrel 42 by the spring 50. This action sets the fish hook in the fish.

In FIGS. 3 and 6 of the drawings are illustrated still another preferred specific embodiment of the hook setting device 70 of our invention. The hook setting device 70 has a cylindrically shaped elongated barrel 72 preferably provided wth interior thread means on each end. A first threaded plug 74 is disposed in one end of the barrel 72 and includes a central threaded aperture 75. A stud element 76 is threadedly disposed in aperture 75 in plug 74. The stud element 76 is provided with eyelets 77 positioned on opposite ends thereof. A lock nut 78 is also disposed on the stud element 76 in abutting engagement with the end of the barrel. The tension-type coil spring 80 is disposed within barrel 72 and is secured at one end to an eyelet 77 on stud element 76. An elongated rod 82 is slidably disposed within barrel 72 and is secured at one end to the opposite end of spring 80. A line attachment eyelet 83 is provided on the other end of elongated rod 82. A small transversely extending peg 84 is mounted on rod 82 adjacent the end secured to the spring 80, as indicated in FIG. 3 of the drawings. A second plug 86 is threadedly secured to the opposite end of barrel 72 and is provided with a central aperture 87 slidably receiving rod 82 therein. It is understood that the plugs 74 and 86 in this embodiment can be secured to the barrel in any suitable manner as for example by welding, force fitting, etc. A first abutment means 88 having a radially disposed surface 89 is provided which is spaced inwardly from the inner surface of plug 86 and extending horizontally at least a quarter of a turn relative thereto. A second abutment means 90 having a longitudinally extending surface 91 is also mounted on plug 86 and serves to support abutment means 88. The relationship of the second abutment means 90 is most clearly shown in FIG. 6 of the drawings.

The hook setting device 70 is loaded when the rod 82 is extended thereby stretching the coil spring. The rod is rotated at least a quarter turn in opposition to the spring to position the peg 84 in abutting relationship to abutment surface 89 and in contact with the abutment surface 91 as shown in FIG. 6. The quarter turn referred to hereinbefore places the spring under a rotational stress, and it is obvious that the rod 82 can be rotated a plurality of turns to increase rotational stress on the spring 80. It can be seen that a small force applied to the rod 82, as for example by a fish pulling at a bait attached to a line in turn attached to the eyelet means 83, will apply a relatively small force to the rod. This small force is sufficient to decrease the frictional contact between peg 84 and surface 89 thereby allowing the stressed spring 80 to rotate the rod 82 at least a quarter turn to position the peg 84 out of an abutting engagement with abutment 88. After the peg 84 is released from the abutment 88 the rod 82 will be retracted by spring 80 applying a firm sharp tug to the fish line thereby setting the hook.

As will be obvious to those skilled in the art, various changes and modifications of the preferred hook setting means of our invention as disclosed herein can be made or followed without departing from the spirit of the disclosure or from the scope of the claims.

We claim:

1. A spring-loaded fish hook setting device comprising, a cylindrically shaped elongated barrel, interior thread means on a first end of said barrel, a firist threaded plug having a central threaded aperture disposed in said first end of said barrel, a stud element threadedly disposed in said threaded aperture in said first plug, a lock nut disposed on said stud element in abutting engagement with the first end of said barrel, eyelet means on each end of said stud element, a tension-type coil spring disposed within said barrel secured at one end to an eyelet means on said stud element, an elongated rod having eyelet means on each end secured at one end to the opposite end of said coil spring, a small transversely extended peg adjacent said one end of said rod, a second plug having a central aperture disposed in and secured to a second opposite end of said barrel with said rod slidably disposed in said last mentioned central aperture, a first abutment means on said second plug having a radially disposed surface spaced inwardly from the inner surface thereof, a second abutment means on said second plug having a longitudinally extended surface, said fish hook setting device being loaded by extending the rod thereby stretching the coil spring, rotating the rod a partial turn, and placing the peg in engagement with said first and said second abutment means.

2. A spring-loaded fish hook setting device comprising, an elongated barrel, a first plug having a central threaded aperture disposed in a first end of said barrel, a stud element threadedly disposed in said aperture in said first plug, a lock nut disposed on said stud element, eyelet means on each end of said stud element, a tension-type coil spring disposed within said barrel secured at one end to an eyelet means on said stud element, an elongated rod having eyelet means on each end secured at one end to the opposite end of said coil spring, a transversely extending projection adjacent said one end of said rod, a second plug having a central aperture secured to an opposite end of said barrel with said rod slidably disposed in said central aperture, a first abutment means on said second plug having a radially disposed surface spaced inwardly from the inner surface thereof, said fish hook setting device being loaded by extending the rod thereby stretching the coil spring, rotating the rod a partial turn and placing the protrusion thereon in engagement with said first abutment means.

3. A fish hook setting means comprising, an elongated barrel, line attachement means on one end of said barrel, a tension-type coil spring disposed within said barrel, means securing one end of said coil spring to said one end of said barrel, an elongated rod secured at one end to the opposite end of said coil spring, means for attaching a fish line on the opposite end of said elongated rod, a transversely extending protrusion adjacent one end of said rod, an abutment means adjacent the other end of said barrel having a radially disposed surface extended substantially a quarter of a turn relative to said barrel, said fish hook setting means loaded by extending the elongated rod thereby stretching the coil spring, and rotating the rod at least a quarter turn and placing the protrusion in engagement with said abutment means.

4. A fish hook setting means comprising, an elongated barrel, line attachment means on one end of said barrel, a resilient means disposed within said barrel, means securing one end of said resilient means to said one end of said barrel, an elongated rod secured at one end to the opposite end of said resilient means, means for attaching a fish line on the opposite end of said elongated rod, a protrusion adjacent one end of said rod, an abutment means adjacent the other end of said barrel having a radially disposed surface extended substantially a quarter of a turn relative to said barrel, said fish hook setting means loaded by extending the elongated rod to place a longitudinal stress on the resilient means, and rotating the rod at least a quarter turn to place the protrusion in engagement with said abutment means.

5. A hook setting means comprising, a barrel, attachment means on one end of said barrel, resilient means disposed within said barrel having one end secured to one end of said barrel, plunger means positioned within said barrel having one end secured to the opposite end of said resilient means, line attachment means on the opposite end of said plunger means, latch means on said plunger means, a radially extended abutment means on the opposite end of said barrel engageable with said latch means, said abutment means extended substantially a quarter of a turn relative to said barrel, said fish hook setting means loaded by extension of said plunger to place said latch means within said radially extended abutment means and concurrently rotating the plunger means at least a quarter turn to place the latch means in frictional engagement with said abutment means under rotational stress whereby slight movement of said plunger means outwardly of said barrel results in a rotation and subsequent rapid retraction of said plunger by said resilient means.

References Cited by the Examiner

UNITED STATES PATENTS

| 2,801,487 | 8/1957 | Morgan | 43—15 |
| 2,850,831 | 6/1958 | Setterdahl | 43—15 |
| 3,060,615 | 10/1962 | Spets | 43——15 |
| 3,220,138 | 11/1965 | Greenfield | 43—15 |

FOREIGN PATENTS

| 1,237,269 | 6/1960 | France. |

SAMUEL KOREN, *Primary Examiner.*

D. J. LEACH, *Assistant Examiner.*